(12) United States Patent
Shaheen et al.

(10) Patent No.: US 7,519,181 B2
(45) Date of Patent: Apr. 14, 2009

(54) SYSTEM AND METHOD FOR ENFORCING NETWORK CLUSTER PROXIMITY REQUIREMENTS USING A PROXY

(75) Inventors: Amal Ahmed Shaheen, Austin, TX (US); Tommy McGuire, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 11/014,560

(22) Filed: Dec. 16, 2004

(65) Prior Publication Data

US 2006/0233372 A1 Oct. 19, 2006

(51) Int. Cl.
*G06F 21/00* (2006.01)
(52) U.S. Cl. ..................................................... 380/258
(58) Field of Classification Search ................. 380/255, 380/281, 258; 713/165, 181; 705/51
See application file for complete search history.

(56) References Cited

U.S. PATENT DOCUMENTS

| 6,748,381 | B1 * | 6/2004 | Chao et al. ..................... 707/10 |
| 7,228,422 | B2 * | 6/2007 | Morioka et al. ............. 713/171 |
| 2003/0198351 | A1 * | 10/2003 | Foster et al. ................ 380/281 |
| 2004/0028017 | A1 | 2/2004 | Whitehill et al. |
| 2004/0078338 | A1 * | 4/2004 | Ohta et al. ..................... 705/51 |
| 2005/0038997 | A1 * | 2/2005 | Kojima et al. ................ 713/165 |
| 2005/0086514 | A1 * | 4/2005 | Han et al. ..................... 713/200 |
| 2005/0086532 | A1 * | 4/2005 | Lotspiech et al. ............ 713/201 |
| 2005/0226416 | A1 * | 10/2005 | Jung et al. ................... 380/228 |
| 2006/0048232 | A1 * | 3/2006 | Jung et al. ..................... 726/27 |
| 2006/0059573 | A1 * | 3/2006 | Jung et al. ..................... 726/31 |
| 2006/0095460 | A1 * | 5/2006 | Iyengar et al. .............. 707/102 |
| 2006/0095763 | A1 * | 5/2006 | Iyengar et al. .............. 713/167 |
| 2006/0126831 | A1 * | 6/2006 | Cerruti et al. ................. 380/30 |

FOREIGN PATENT DOCUMENTS

| WO | WO0193434 | 6/2001 |
| WO | WO2004030311 | 8/2004 |

OTHER PUBLICATIONS

Cole, Raywid & Braverman,: Anaylsis of the FCC's "Broadcast Flag" Technology Approval Order; Internet: URL: www.crblaw.com/news/>.
IBM Research Division Almaden: "xCP: eXtensible Content Protection"; Internet: URL: www-03.ibm.com/industries/media/doc/content/bin/xCP_Whitepaper.doc>.

* cited by examiner

*Primary Examiner*—Gilberto Barron, Jr.
*Assistant Examiner*—Hadi Armouche
(74) *Attorney, Agent, or Firm*—Janis E. Clements

(57) ABSTRACT

A system, method and computer program for enforcing network cluster proximity requirements using a proxy is useful in preventing unauthorized devices from receiving encrypted broadcast content intended for only authorized users within a network cluster. The current art allows users to remotely establish trust via a cryptographic handshake. This results in encrypted broadcast content being delivered to unauthorized devices. The present invention assures that encrypted broadcast content is delivered to only authorized devices, allowing authorized remote devices to receive encrypted broadcast content while preventing unauthorized remote devices from doing so. The present invention enforces network proximity requirements to authorized devices within a defined area by timing the cryptographic handshaking, and by authorizing device proxies within a geographic area for retransmitting to authorized remote devices outside said geographic area.

5 Claims, 4 Drawing Sheets

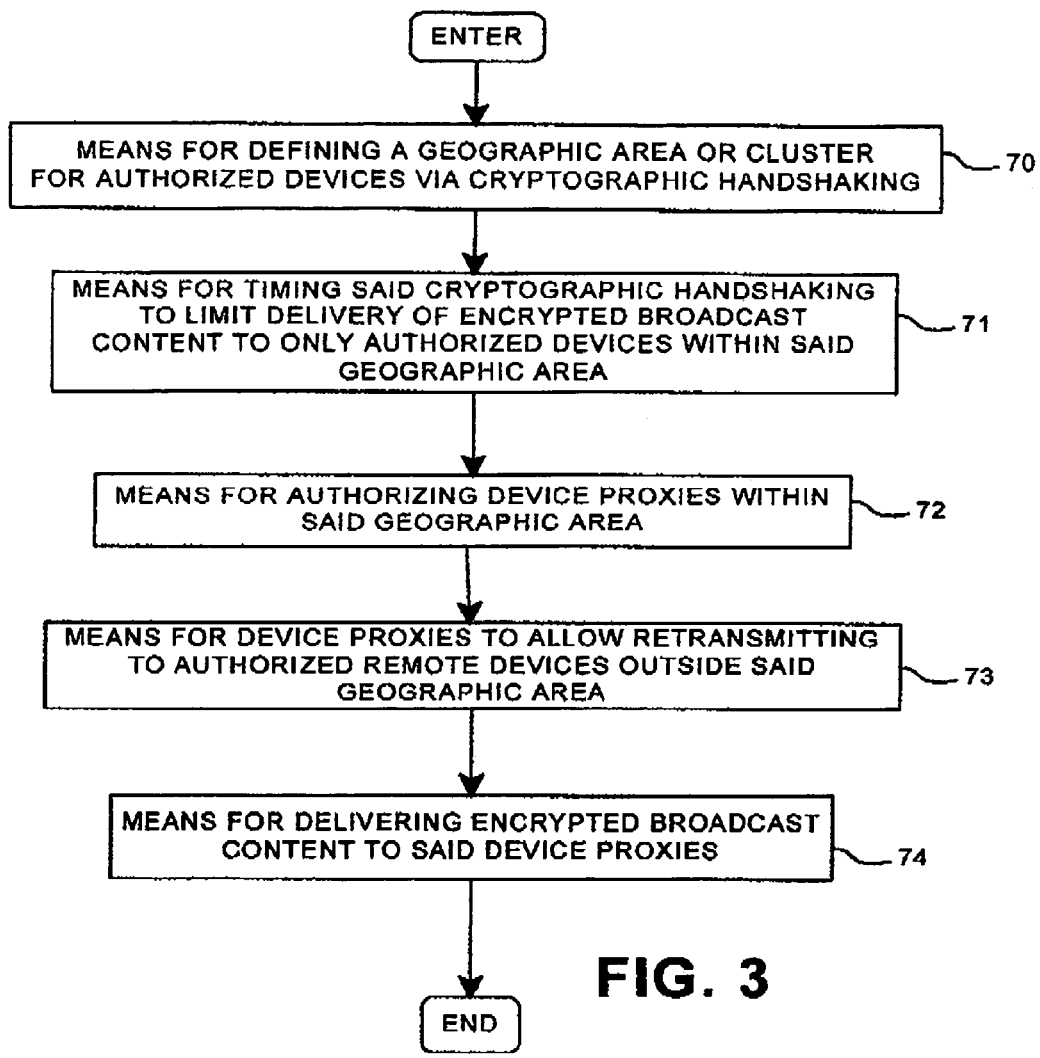

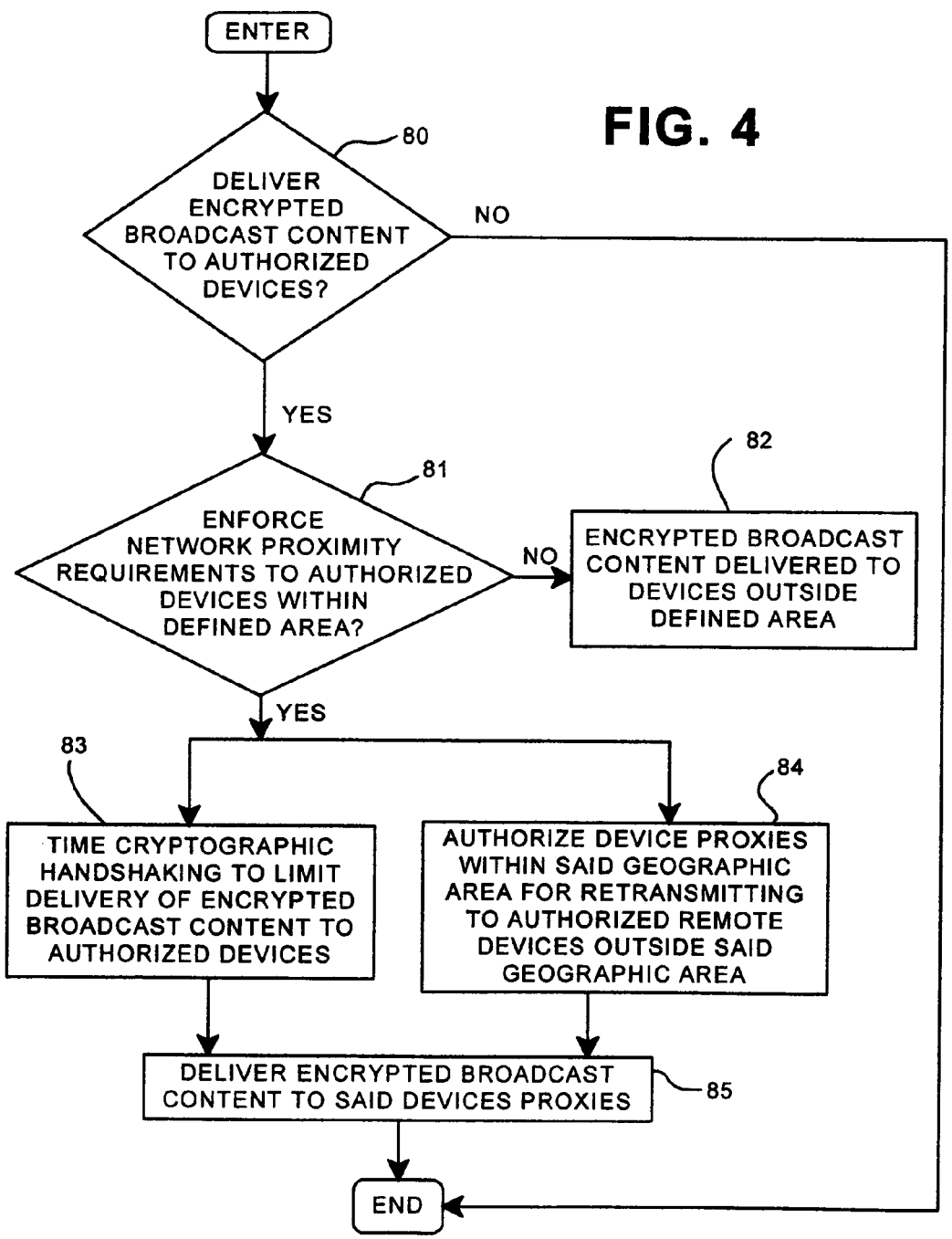

SYSTEM AND METHOD FOR ENFORCING NETWORK CLUSTER PROXIMITY REQUIREMENTS USING A PROXY

TECHNICAL FIELD

The present invention relates to multimedia content transmitted over communication networks such as the Internet to display terminals, and particularly the sharing of such multimedia content between a plurality of devices connected by a network transport mechanism.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is Internet related distribution of documents. The Web or Internet, which had quietly existed for over a generation as a loose academic and government data distribution facility, reached, "critical mass" and commenced a period of phenomenal expansion. With this expansion, businesses and consumers have direct access to all matter of documents and media through the Internet.

With the advent of consumer digital technology, content such as music and movies are no longer bound to the physical media that carry it. Advances in consumer digital technology present new challenges to content owners such as record labels, studios, distribution networks, and artists who want to protect their intellectual property from unauthorized reproduction and distribution. Recent advances in broadcast encryption offer an efficient alternative to more traditional solutions based on public key cryptography. In comparison with public key methods, broadcast encryption requires orders of magnitude less computational overhead in compliant devices. In addition, broadcast encryption protocols are one-way, not requiring any low-level handshakes, which tend to weaken the security of copy protection schemes.

"International Business Machines™has developed a content protection system based on broadcast encryption . . . "called eXtensible Content Protection, referred to as "xCP." xCP supports a trusted domain called a 'cluster' that groups together a number of compliant devices. Content can freely move among these devices, but it is useless to devices that are outside the cluster.

Each compliant device is manufactured with a set of device keys. A key management block ("KMB") is a data structure containing an encryption of a management key using every compliant device key in the set of device keys for a compliant device. That is, a KMB contains a multiplicity of encrypted instances of a management key, one for every device key in the set of device keys for a device. Each compliant device, using one of its own device keys, is capable of extracting an encrypted management key from a key management block and decrypting it. That is, the management key for a cluster is calculated from the key management block, and it is the ability to calculate a management key from a key management block that distinguishes compliant devices.

A cluster is a private domain. Compliant devices can join a cluster. Each compliant device stores a KMB and a list of authorized devices for the cluster, called an authorization table. Each device can also authorize other compliant devices to join the cluster. In a compliant cluster, when a consumer purchases a new device and installs it in his home, the device automatically determines whether a cluster is currently present, and asks to join the cluster. If no cluster is present, the device creates a new cluster consisting only of itself. Additional devices installed later will join this cluster. Each piece of content or each content stream in the home is protected with a unique key. These keys are called title keys. Each title key is encrypted with a master key for the particular home, called a binding key. To play protected content, a device reads the encrypted title key embedded in the content file and decrypts it with the binding key. Then, with the title key, the device decrypts the content itself. The binding key is calculated as the cryptographic hash of three quantities: the management key, the cluster ID, and a hash of the cluster's authorization table. The cluster ID is a unique identification code for a cluster established at cluster startup. The network authorization table is a simple file whose records represent the list of devices in the cluster.

A new compliant device may join a cluster as follows:

The new device broadcasts a "whosthere" message to a cluster network.

An existing device answers with an "imhere" message, including cluster name, the cluster KMB, and a hash of a cluster authorization table.

The new device downloads the KMB from the existing device.

The new device computes the cluster management key from the KMB and its own device keys.

The new device computes a message authorization code ("MAC") by cryptographically hashing the management key with the new device's deviceID.

The new device sends an authorization request to the cluster server, including the new device's deviceID and device type.

The existing device computes the management key using the KMB and its own device keys. This management key is the same as the management key computed by the new device.

The existing device computes the MAC using the new device's deviceID and device type, verifying the MAC received from the new device.

If the MAC matches, the existing device adds the new device to its authorization table.

The existing device sends an 'authorized' message to the new device, including an encrypted clusterID, encrypted with a authorization key created by hashing the management key and the new device's deviceID.

The new device generates the authorization key by hashing the management key and the new device's deviceID and uses the authorization key to decrypt the encrypted clusterID.

The new device downloads the new authorization table from the existing device.

The new device computes the binding key for the cluster by hashing the management key, a hash of the new authorization table, and the clusterID.

There are some drawbacks to this procedure. The xCP Cluster Protocol is intended to provide an infrastructure for legally and securely sharing multimedia content between a plurality of devices connected by a network transport mechanism, and establishes trust among the devices with a secure, cryptographic handshake after receiving the "imhere" message from a receiving device. However, the xCP Cluster Protocol described above allows restrictions on playing content in restricted geographic areas to be violated. One possible such restriction is a "blackout area," where playing a specific piece of content or content stream is disallowed by the content producer.

SUMMARY OF THE PRESENT INVENTION

The present invention provides a solution to the previously recited problems by a system, method and related computer program for enforcing network cluster proximity requirements by use of a proxy. More particularly, the present invention provides a method for satisfying requirements on accessing secured content by disallowing remote access to the content when such access is not permitted. The invention is a communication network system for delivering encrypted broadcast content to authorized devices. It enforces network cluster proximity requirements to authorized devices within a defined geographic area via cryptographic handshaking. The invention has means for timing said cryptographic handshaking to limit the delivery of said encrypted broadcast content to only authorized devices within said geographic area. Further, the invention can authorize device proxies within said geographic area for retransmitting to authorized remote devices outside of said geographic area, the encrypted broadcast content delivered to said device proxies.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is an illustrative flowchart describing setting up of the functions for delivering encrypted broadcast content to authorized devices of the present invention; and FIG. 4 is a flowchart of an illustrative run of the program set up according to FIG. 3.

DETAILED DESCRIPTION OF THE PREFERRED EMBODIMENT

Figure 1:
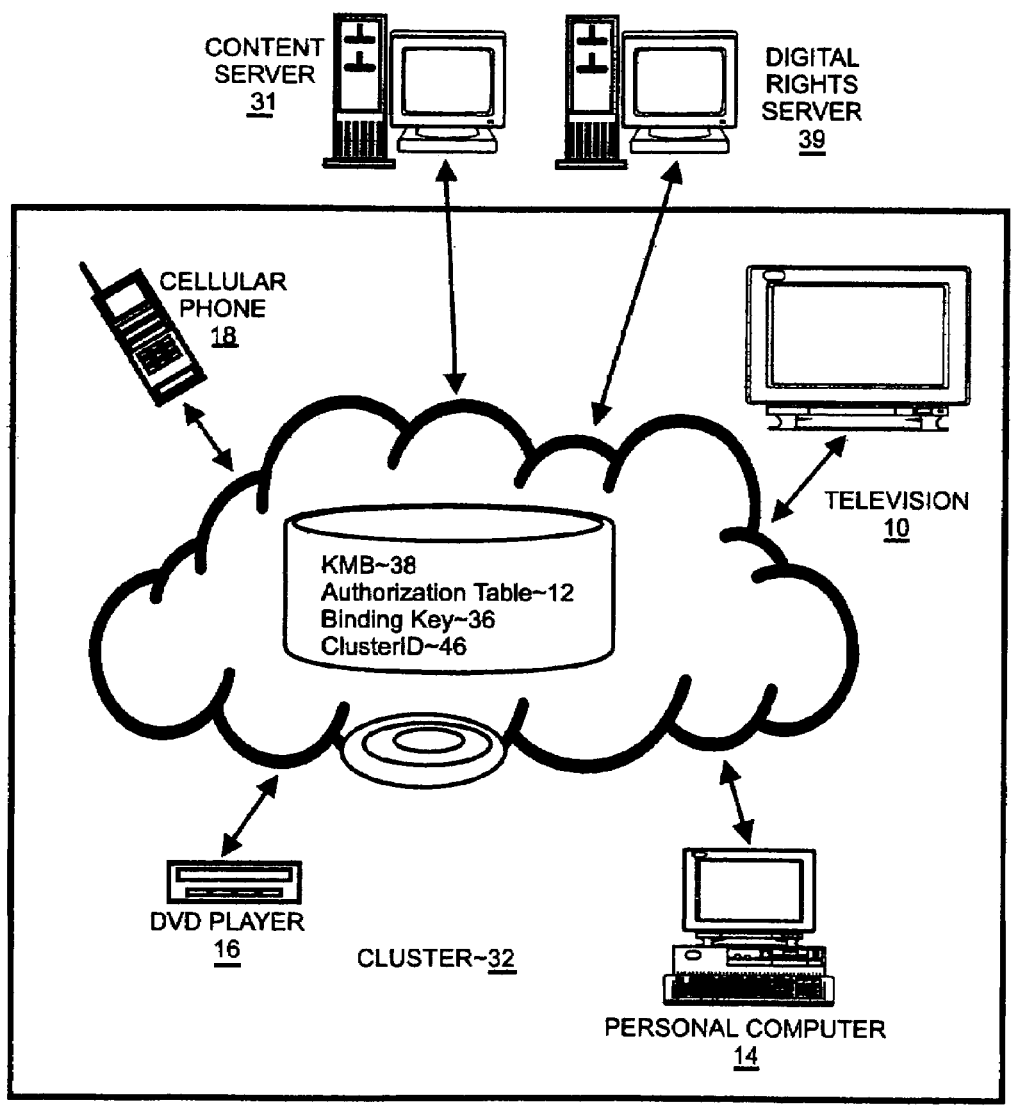
FIG. 1 is a line drawing of an exemplary network architecture in which methods and systems according to embodiments of the present invention may be implemented.

Referring to FIG. 1, a line drawing of an exemplary network architecture is shown in which methods and systems according to embodiments of the present invention may be implemented. The network of FIG. 1 includes an xCP compliant network cluster 32 that includes several xCP compliant network devices including a cellular telephone 18, a television 10, a DVD player 16, and a personal computer 14.

The network cluster supports a key management block 38 for the cluster, an authorization table 12 that identifies all the devices currently authorized to join in the cluster, a binding key 36 for the cluster, and a cluster ID 46. The key management block 38 is a data structure containing an encryption of a management key with every compliant device key. That is, the key management block contains a multiplicity of encrypted instances of a management key, one for every device key in the set of device keys for a device. The binding key 36 for the cluster is calculated as a cryptographic hash of a management key, a cluster ID, and a unique data token for the cluster. The management key for the cluster is calculated from the key management block 38 and device keys.

The network of FIG. 1 includes a content server 31 that is capable of encrypting content with title keys provided to it by content providers, content owners, or a legal licensing authority. Content server 31 is also capable of calculating a binding key for a cluster, given enough information about the cluster, and using the binding key 36 to encrypt a title key and package it with encrypted contents. More particularly, content server 31 may control broadcast encryption of content for a network cluster 32 from outside the cluster by receiving from a network device in the cluster a key management block 38 for the cluster 32, a unique data token for the cluster 32, and an encrypted cluster ID. The content server is capable of using the key management block 38 for the cluster 32, the unique data token for the cluster 32, and the encrypted cluster ID to calculate the binding key for the cluster.

The network of FIG. 1 further includes a digital rights server 39 that is capable of storing rights objects that define rights for the broadcast encryption content. In addition, a digital rights server 39 is also capable of calculating a binding key for a cluster, given enough information about the cluster, and using the binding key to encrypt a title key and insert it into a rights object. More particularly, digital rights server 39 may function to control broadcast encryption of content for a network cluster 32 from outside the cluster by encrypting a title key with a binding key 36, inserting the encrypted title key into the rights object, and sending the rights object separately from broadcast encryption content. A digital rights server may be capable of using a key management block 38 for the cluster 32, a unique data token for the cluster 32, and an encrypted cluster ID to calculate a binding key for the cluster.

Figure 2:
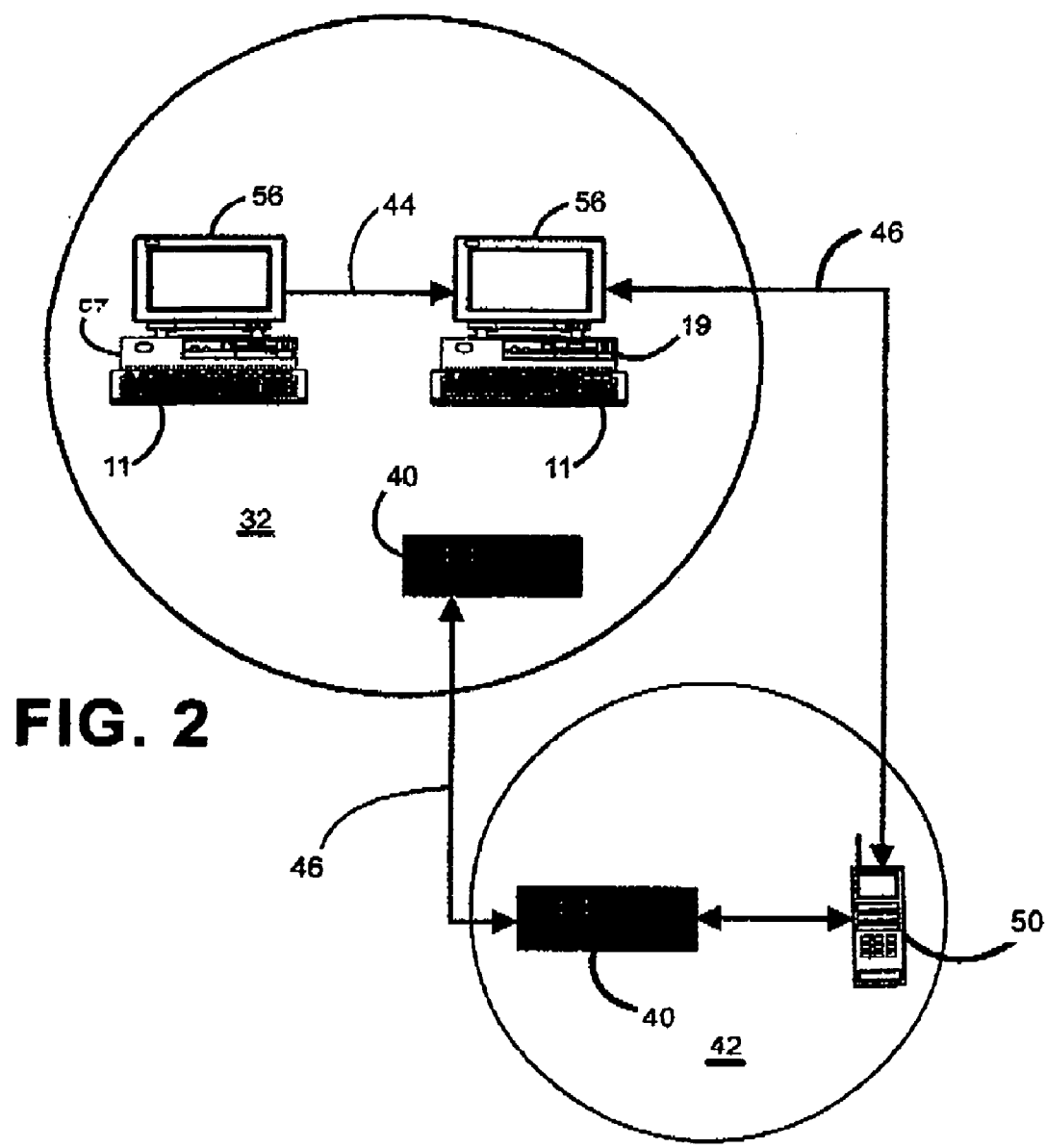
FIG. 2 is a generalized view of a network system that may be used in the practice of the present invention.

A generalized diagram of a network system that may be used in the practice of the present invention is shown in FIG. 2. A primary user 57 (for purposes of illustration) operating display station 56 or terminal 11 connected for network communications with another user 19 in an xCP compliant network cluster 32 respectively connected through another user controlled station 13 for network communications within the cluster 32. In the present invention, the communication network system delivers encrypted broadcast content to authorized devices 57, 19. Network cluster proximity requirements are enforced regarding authorized devices 57, 19 within a defined geographic area/cluster 32 via cryptographic handshaking. The cryptographic handshaking is timed to limit the delivery of said encrypted broadcast content to only said authorized devices 57, 19 within said geographic area 32, and can detect whether a transmission has a short round-trip time 44 or a long round-trip time 46. A short round-trip time 44 indicates that the transmission of the encrypted broadcast content is within the network cluster/defined geographic area 32. A long round-trip time 46 indicates that the transmission is outside the network cluster/defined geographic area 32. Device proxies 40 are authorized within said geographic area 32 for retransmitting to authorized remote devices 50 outside of said geographic area that are in a blackout area 42, the encrypted broadcast content delivered to said device proxies 40. Device proxies 40 include the use of hardware facilities which can use location information to enforce network cluster proximity requirements. Said hardware facilities could also use information from the network devices to enforce network cluster proximity requirements. Device proxies also include a home network device which communicates with other network compliant devices to enforce network cluster proximity requirements. Remote devices 50 include such devices as cellular telephones, PDAs, and personal computers.

FIG. 3 is a flowchart showing the development of a process according to the present invention for enforcing network cluster proximity requirements to authorized devices while delivering encrypted broadcast content. A geographic area or cluster is defined for authorized devices via cryptographic handshaking, step 70. Said cryptographic handshaking is timed to limit the delivery of encrypted broadcast content to only said authorized devices within said geographic area, step 71. The timing of the cryptographic handshaking can be done by a statistical measure of the round-trip time between sending a message on the network and receiving the reply. A message that must traverse the global Internet in order to reach a blacked-out area (an area outside the cluster) takes longer to be received than a message that traverses a local area home network. One such statistical measure of excluding unauthorized devices from receiving encrypted broadcast content is to compute the standard deviation of round-trip times of cryptographic handshaking over several broadcast intervals, and exclude those devices whose times were outside some multiplier of the standard deviation. This could be implemented by initially allowing a large maximum round-trip time for the cryptographic handshaking, i.e. 10 minutes. As devices are added to the network cluster, the mean and standard deviation of the round-trip times for each device are measured. A new, potential maximum round-trip time would be calculated as the mean plus 2 times the standard deviation, and if this potential maximum round-trip time is less than the current maximum round-trip time, the time is adopted as the new current maximum. The accuracy of this statistical determination could be improved by focusing on the xCP cluster protocol messages which do not require cryptographic handshaking. In the cluster protocol, some messages, such as the initial cryptographic handshake, require more computation than others. By focusing on the messages that have lesser computational requirements, differences in processing power between devices becomes less of a factor in determining round-trip times.

In FIG. 3, device proxies are authorized within said geographic area, step 72. Said device proxies allow for retransmitting to authorized remote devices outside of said geographic area, step 73. The encrypted broadcast content to be delivered to said device proxies, step 74.

A simplified run of the process set up in FIG. 3 will now be described in with respect to the flowchart of FIG. 4. First, a determination is made as to whether encrypted broadcast content is to be delivered to authorized devices, step 80. If No, the process ends. If Yes, a determination is made as to whether to enforce network proximity requirements to authorized devices within a defined geographical area, step 81. If No, then encrypted broadcast content is delivered to devices inside and outside the defined geographical area, step 82. If Yes, the enforcement of network proximity requirements to authorized devices within a geographical area can be achieved by timing cryptographic handshaking to limit delivery of encrypted broadcast content to authorized devices, step 83, and/or by authorizing device proxies within said geographic area for retransmitting to authorized remote devices outside said geographic area, step 84. Encrypted broadcast content is then delivered to said device proxies, step 85.

The present invention is described in this specification in terms of methods for controlling delivery of broadcast encryption content for a network cluster from a content server outside the cluster. One skilled in the art should appreciate that the processes controlling the present invention are capable of being distributed in the form of computer readable media of a variety of forms. The invention may also be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Although certain preferred embodiments have been shown and described, it will be understood that many changes and modifications may be made therein without departing from the scope and intent of the appended claims.

The invention claimed is:

1. A communication network system for delivering encrypted broadcast content to authorized devices comprising:
 a device authorization unit for authorizing devices within a geographic area via cryptographic handshaking;
 a timer for timing the cryptographic handshaking process;
 a content delivery unit for delivering encrypted broadcast content only to authorized devices within said geographic area; and
 one or more device proxies, wherein said device proxies are authorized devices within the geographic area and are enabled to send encrypted broadcast content to authorized devices outside of said geographic area;
 wherein the timer identifies authorized devices by length of time transmission;
 wherein the device proxies comprise hardware facilities;
 wherein the hardware facilities use location information to enforce network cluster proximity requirements;
 wherein the hardware facilities use information from the authorized devices to enforce network cluster proximity requirements;
 wherein the device proxies comprise a home network system which communicates with other network compliant devices to enforce network cluster proximity requirements;
 wherein one or more devices are added to the network cluster;
 wherein mean and standard deviation of round-trip times for each new device are measured;
 wherein a new, potential maximum round-trip time is calculated as the mean plus two times the standard deviation;
 wherein the potential maximum round-trip time is less than a current maximum round-trip time;
 wherein the potential maximum round-trip time is adopted as a new current maximum round-trip time.

2. The communication network system of claim 1, wherein a network compliant device is a cellular telephone.

3. A method for delivering encrypted broadcast content to authorized devices including steps of:
 initiating cryptographic handshaking with a device;
 designating said device as an authorized device if said cryptographic handshaking is successful;
 timing said cryptographic handshaking;
 limiting the delivery of said encrypted broadcast content to only said authorized devices within a geographic area based on said timing;
 authorizing one or more device proxies within said geographic area for retransmitting encrypted broadcast content to authorized remote devices outside of said geographic area;
 wherein the timer identifies authorized devices by length of time transmission;
 wherein the device proxies comprise hardware facilities;
 wherein the hardware facilities use location information to enforce network cluster proximity requirements;
 wherein the hardware facilities use information from the authorized devices to enforce network cluster proximity requirements;

wherein the device proxies comprise a home network system which communicates with other network compliant devices to enforce network cluster proximity requirements;

adding one or more devices to the network cluster;

measuring mean and standard deviation of round-trip times for each new device;

calculating a new, potential maximum round-trip time as the mean plus two times the standard devistion;

wherein the potential maximum round-trip time is less than a current maximum round-trip time; and adopting the potential maximum round-trip time as a new current maximum round-trip time.

4. The method of claim 3 wherein a network compliant device is a cellular telephone.

5. A computer program product having code recorded on a computer readable medium for fast communication with a symbol linked object based system in a communication network for delivering encrypted broadcast content to authorized devices, said computer program product comprising code for:

enforcing network cluster proximity requirements to authorized devices within a defined geographic area via cryptographic handshaking;

timing said cryptographic handshaking to limit the delivery of said encrypted broadcast content to only said authorized devices within said geographic area;

authorizing device proxies within said geographic area for retransmitting to authorized remote devices outside of said geographic area, the encrypted broadcast content delivered to said device proxies;

wherein the timer identifies authorized devices by length of time transmission;

wherein the device proxies comprise hardware facilities;

wherein the hadrware facilities use location information to enforce network cluster proximity requirements;

wherein the hardware facilities use information from the authorized devices to enforce network cluster proximity requirements;

wherein the device proxies comprise a home network system which communicates with other network compliant devices to enforce network cluster proximity requirements;

adding one or more devices to the network cluster;

measuring mean and standard deviation of round-trip times for each new device;

calculating a new, potential maximum round-trip time as the mean plus two times the standard deviation;

wherein the potential maximum round-trip time is less than a current maximum round-trip time; and adopting the potential maximum round-trip time as a new current maximum round-trip time.

* * * * *